United States Patent
Zhang et al.

(10) Patent No.: US 12,541,963 B2
(45) Date of Patent: Feb. 3, 2026

(54) METHOD AND DEVICE WITH NEURAL NETWORK TRAINING AND IMAGE PROCESSING

(71) Applicant: SAMSUNG ELECTRONICS CO., LTD., Suwon-si (KR)

(72) Inventors: Xiaolei Zhang, Xi'an (CN); Zhaohui Lv, Xi'an (CN); Mingming Fan, Xi'an (CN); Zixuan Leng, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 538 days.

(21) Appl. No.: 17/987,312

(22) Filed: Nov. 15, 2022

(65) Prior Publication Data

US 2023/0154173 A1  May 18, 2023

(30) Foreign Application Priority Data

Nov. 16, 2021  (CN) .......................... 202111357582.5
Oct. 7, 2022  (KR) .......................... 10-2022-0128935

(51) Int. Cl.
*G06V 10/82* (2022.01)
*G06N 3/045* (2023.01)

(52) U.S. Cl.
CPC ............. *G06V 10/82* (2022.01); *G06N 3/045* (2023.01)

(58) Field of Classification Search
CPC .......... G06N 3/045; G06N 3/047; G06N 3/08; G06N 3/084; G06N 3/088; G06V 10/761; G06V 10/774; G06V 10/806; G06V 10/82
See application file for complete search history.

(56) References Cited

U.S. PATENT DOCUMENTS

| | | | |
|---|---|---|---|
| 10,592,725 B2* | 3/2020 | Lim | G06N 3/04 |
| 2018/0268292 A1 | 9/2018 | Choi et al. | |
| 2019/0380792 A1* | 12/2019 | Poltaretskyi | G06N 3/08 |
| 2020/0034702 A1* | 1/2020 | Fukuda | G06N 3/08 |

(Continued)

FOREIGN PATENT DOCUMENTS

| | | |
|---|---|---|
| CN | 104517122 A | 4/2015 |
| CN | 110033077 A | 7/2019 |

(Continued)

OTHER PUBLICATIONS

Lin Wang et al., "Knowledge Distillation and Student-Teacher Learning for Visual Intelligence: A Review and New Outlooks," Jan. 29, 2021, IEEE Transactions on Pattern Analysis and Machine Intelligence, vol. 44, No. 6, Jun. 2022, pp. 3048-3062.*

(Continued)

*Primary Examiner* — Omar S Ismail
(74) *Attorney, Agent, or Firm* — NSIP Law (57) ABSTRACT

A processor-implemented method includes: generating a first output of each of two or more layers of a teacher network, based on a first image; generating pseudo labels respectively corresponding to the first outputs, based on the first outputs; generating a second output using one or more layers of a student network comprising an output layer, based on the first image; generating prediction results respectively corresponding to the two or more layers of the teacher network, based on the second output; and training the student network by updating the student network based on the pseudo labels and the prediction results.

23 Claims, 5 Drawing Sheets

(56) References Cited

U.S. PATENT DOCUMENTS

| | | | |
|---|---|---|---|
| 2020/0034703 A1* | 1/2020 | Fukuda | G10L 25/51 |
| 2020/0302295 A1* | 9/2020 | Tung | G06N 3/08 |
| 2020/0394458 A1* | 12/2020 | Yu | G06V 10/82 |
| 2021/0248983 A1* | 8/2021 | Balassanian | G06N 3/08 |
| 2021/0357687 A1* | 11/2021 | Gao | G06F 18/2431 |
| 2022/0012637 A1* | 1/2022 | Rezazadegan Tavakoli | G06N 3/09 |
| 2022/0058507 A1* | 2/2022 | El-Khamy | G06N 3/09 |
| 2022/0076136 A1* | 3/2022 | Passban | G06N 3/088 |
| 2022/0083840 A1* | 3/2022 | Luong | G06N 20/00 |
| 2022/0188636 A1* | 6/2022 | Pham | G06N 3/045 |
| 2022/0261593 A1* | 8/2022 | Yu | G06F 18/214 |
| 2022/0335303 A1* | 10/2022 | Haidar | G06N 3/094 |
| 2022/0343139 A1* | 10/2022 | Passban | G06N 3/08 |
| 2023/0022947 A1* | 1/2023 | Won | G10H 1/0008 |
| 2023/0092147 A1* | 3/2023 | Shao | G06N 3/096 706/15 |
| 2023/0154173 A1* | 5/2023 | Zhang | G06N 3/084 382/156 |
| 2023/0326195 A1* | 10/2023 | Venkataramanan | G06V 10/25 382/157 |
| 2024/0169251 A1* | 5/2024 | Herard | G06N 3/0455 |

FOREIGN PATENT DOCUMENTS

| | | | | |
|---|---|---|---|---|
| CN | 110276413 A | | 9/2019 | |
| CN | 110674880 A | | 1/2020 | |
| CN | 111950638 A | | 11/2020 | |
| CN | 112052948 A | | 12/2020 | |
| CN | 112767468 A | | 5/2021 | |
| CN | 112991330 A | * | 6/2021 | G01N 21/8851 |
| CN | 113033774 A | | 6/2021 | |
| CN | 113128600 A | | 7/2021 | |
| CN | 113160375 A | | 7/2021 | |
| CN | 113177612 A | | 7/2021 | |
| CN | 113283386 A | | 8/2021 | |
| CN | 113901931 A | * | 1/2022 | G06F 18/241 |
| EP | 3971782 A2 | * | 3/2022 | G06N 3/048 |

OTHER PUBLICATIONS

Jiafeng Xie et al., "Improving Fast Segmentation With Teacher-Student Learning," Oct. 19, 2018, Computer Vision and Pattern Recognition, arXiv:1810.08476, pp. 1-6.*

Sajjad Abbasi et al., "Modeling Teacher-Student Techniques in Deep Neural Networks for Knowledge Distillation," Jun. 15, 2020,2020 2020 International Conference on Machine Vision and Image Processing (MVIP), pp. 1-7.*

Minchul Shin, "Semi-supervised Learning with a Teacher-Student Network for Generalized Attribute Prediction," Nov. 27, 2020, Computer Vision—ECCV 2020, LNCS 12356, pp. 509-520.*

Yongcheng Liu et al., "Multi-Label Image Classification via Knowledge Distillation from Weakly-Supervised Detection," Oct. 15, 2018, MM'18, Oct. 22-26, 2018, Seoul, Republic of Korea, pp. 700-705.*

Yimeng Wu et al., "Universal-KD: Attention-based Output-Grounded Intermediate Layer Knowledge Distillation," Nov. 2021, Proceedings of the 2021 Conference on Empirical Methods in Natural Language Processing, pp. 7649-7656.*

Xionghui Wang et al., "Progressive Teacher-student Learning for Early Action Prediction," Jun. 2019, Proceedings of the IEEE/CVF Conference on Computer Vision and Pattern Recognition (CVPR), 2019, pp. 3556-3562.*

Chen, Ting, et al. "A simple framework for contrastive learning of visual representations." *International conference on machine learning.* PMLR, 2020.

Caron, Mathilde, et al. "Unsupervised learning of visual features by contrasting cluster assignments." *Advances in Neural Information Processing Systems* 33 (2020): pp. 9912-9924.

Fang, Zhiyuan, et al. "Seed: Self-supervised distillation for visual representation." arXiv preprint arXiv:2101.04731 (2021).

Xu, Haohang, et al. "Seed the views: Hierarchical semantic alignment for contrastive representation learning." *IEEE Transactions on Pattern Analysis and Machine Intelligence* (2022).

Grill, Jean-Bastien, et al. "Bootstrap your own latent-a new approach to self-supervised learning." *Advances in neural information processing systems* 33 (2020): pp. 21271-21284.

Gidaris, Spyros, et al. "Obow: Online bag-of-visual-words generation for self-supervised learning." *Proceedings of the IEEE/CVF Conference on Computer Vision and Pattern Recognition.* 2021.

Chen, Xinlei, et al. "Improved baselines with momentum contrastive learning." arXiv preprint arXiv:2003.04297 (2020).

Chinese Office Action issued on Mar. 28, 2025, in corresponding Chinese Patent Application No. 202111357582.5. (8pages in English, 10 pages in Chinese).

* cited by examiner

METHOD AND DEVICE WITH NEURAL NETWORK TRAINING AND IMAGE PROCESSING

CROSS-REFERENCE TO RELATED APPLICATIONS

This application claims the benefit under 35 USC § 119(a) of Chinese Patent Application No. 202111357582.5, filed on Nov. 16, 2021 with the China National Intellectual Property Administration, and Korean Patent Application No. 10-2022-0128935, filed on Oct. 7, 2022 with the Korean Intellectual Property Office, the entire disclosures of which are incorporated herein by reference for all purposes.

BACKGROUND

1. Field

The following description relates to a method and device with neural network training and image processing.

2. Description of Related Art

Artificial neural networks may be used in various ways.

Artificial neural networks may be used in the image processing field, and neural network training methods may be implemented to acquire accurate image processing results based on input images.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, processor-implemented method includes: generating a first output of each of two or more layers of a teacher network, based on a first image; generating pseudo labels respectively corresponding to the first outputs, based on the first outputs; generating a second output using one or more layers of a student network comprising an output layer, based on the first image; generating prediction results respectively corresponding to the two or more layers of the teacher network, based on the second output; and training the student network by updating the student network based on the pseudo labels and the prediction results.

The generating of the first output of each of the two or more layers of the teacher network may include: generating one or more second images by performing weak enhancement processing on the first image; generating one or more third images by performing strong enhancement processing on the first image; and based on the one or more second images, generating the first output of each of the two or more layers of the teacher network corresponding to the one or more second images, wherein a number of the one or more second images and a number of the one or more third images may be the same.

The generating of the second output may include: based on the one or more third images, generating an output of each layer of the one or more layers of the student network comprising the output layer corresponding to the one or more third images, and generating the second output by merging the output of each layer corresponding to the one or more third images into the corresponding second outputs.

The generating of the one or more second images may include: generating a plurality of weak first images by performing weak enhancement processing on the first image; generating a plurality of weak additional images by performing weak enhancement processing on an additional image; and generating the one or more second images by fusing the plurality of weak first images and the plurality of weak additional images.

The generating of the one or more second images by fusing the plurality of weak first images and the plurality of weak additional images may include: adjusting a size of each the weak additional images by a product of a predetermined ratio and a size of a corresponding one of the weak first images; and generating the one or more second images by overlapping each of the weak additional images, comprising the adjusted size, onto a predetermined area of the corresponding one of the weak first images.

The generating of the one or more third images may include: generating a plurality of strong first images by performing strong enhancement processing on the first image; generating a plurality of strong additional images by performing strong enhancement processing on an additional image; and generating the one or more third images by fusing the plurality of strong first images and the plurality of strong additional images, and wherein the plurality of strong first images each may have a size different from a size of the first image.

The generating of the pseudo labels may include: determining a similarity between the first output of each of the two or more layers of the teacher network and a previous output of a corresponding layer of the two or more layers of the teacher network; and generating the pseudo labels based on the determined similarities.

The determining of the similarities may include determining a Euclidean distance between each of the first outputs and the previous output of the corresponding layer as the similarities.

The generating of the pseudo label further may include: generating intermediate images respectively corresponding to second images by resizing each of weak first images and overlapping each of the weak first images in response to performing resizing on a corresponding predetermined area; generating a third output of each layer of the two or more layers of the teacher network corresponding to the intermediate image corresponding to each of the second images; generating pseudo labels respectively corresponding to the third outputs based on the third outputs; and generating final pseudo labels respectively corresponding to the first outputs by fusing the pseudo labels respectively corresponding to the first outputs and the pseudo labels respectively corresponding the third outputs, wherein each of the second images and the intermediate image corresponding to each of the second images may be generated based on the same weak first image and weak additional image.

The generating of the final pseudo labels may include generating the final pseudo labels based on a predetermined ratio, pseudo label respectively corresponding to the first outputs of each of the second images, and a pseudo label respectively corresponding to the third outputs of the intermediate image corresponding to each of the second images.

The generating of the prediction results may include generating the prediction result by determining a similarity between a previous output of each layer of the two or more layers of the teacher network and the second outputs as the prediction result corresponding to each layer of the two or more layers.

The updating of the student network may include: determining a loss comprising a difference between each prediction result of one or more third images and a corresponding pseudo label of any one second image based on the corresponding pseudo label and the prediction result; and updating the student network based on the determined loss.

The determining of the loss further may include determining, as the loss, a sum of a loss corresponding to a third image of a first size and a loss corresponding to a third image of a second size.

One or more layers in the student network comprising the output layer may be adjacent to another layer.

In another general aspect, one or more embodiments include a non-transitory computer-readable storage medium storing instructions that, when executed by one or more processors, configure the one or more processors to perform any one, any combination, or all operations and methods described herein.

In another general aspect, an electronic device includes: a processor configured to: generate a first output of each of two or more layers of a teacher network based on a first image; generate pseudo labels respectively corresponding to the first outputs, based of the first outputs; generate a second output using one or more layers of a student network comprising an output layer, based on the first image; generate prediction results respectively corresponding to the two or more layers of the teacher network, based on the second output; and train the student network by updating the student network based on the pseudo label and the prediction result.

For the generating of the first output of each of the two or more layers of the teacher network, the processor may be configured to: generate one or more second images by performing weak enhancement processing on the first image; and generate one or more third images by performing strong enhancement processing on the first image, and based on the one or more second images, generate the first output of each of the two or more layers of the teacher network corresponding to the one or more second images, and wherein a number of the one or more second images and a number of the one or more third images may be the same.

For the generating of the second output, the processor may be configured to: based on the one or more third images, generate an output of each layer of one or more layers of the student network comprising the output layer corresponding to the one or more third images, and generate the second output by merging the output of each layer corresponding to the one or more third images into the corresponding second outputs.

For the generating of the one or more third images, the processor may be configured to: generate a plurality of strong first images by performing strong enhancement processing on the first image; generate a plurality of strong additional images by performing strong enhancement processing on an additional image; and generate the one or more third images by fusing the plurality of strong first images and the plurality of strong additional images, and the plurality of strong first images may each have a size different from a size of the first image.

For the generating of the pseudo label, the processor may be configured to: generate intermediate images respectively corresponding to second images by resizing each of weak first images and overlapping each of the weak first images in response to performing resizing on a corresponding predetermined area; generate a third output of each layer of the two or more layers of the teacher network corresponding to the intermediate image corresponding to each of the second images; generate pseudo labels respectively corresponding to the third outputs based on the third outputs; and generate final pseudo labels respectively corresponding to the first outputs by fusing the pseudo labels respectively corresponding to the first outputs and the pseudo labels respectively corresponding the third outputs, wherein each of the second images and the intermediate image corresponding to each of the second images may be generated based on the same weak first image and weak additional image.

The one or more layers in the student network comprising the output layer may be adjacent to another layer.

For the generating of the pseudo labels, the processor may be configured to: determine a similarity between the first output of each of the two or more layers of the teacher network and a previous output of a corresponding layer of the two or more layers of the teacher network; and generate the pseudo labels respectively corresponding to the first outputs, based on the determined similarities.

In another general aspect, a processor-implemented method includes: generating a first output of each of two or more layers of a teacher network, based on a first image; determining a similarity between the first output of each of the two or more layers of the teacher network and a previous output of a corresponding layer of the two or more layers of the teacher network; and generating pseudo labels respectively corresponding to the first outputs, based on the determined similarities; generating prediction results respectively corresponding to the two or more layers of the teacher network, based on a second output generated using one or more layers of a student network; and training the student network by updating the student network based on the pseudo labels and the prediction results.

Other features and aspects will be apparent from the following detailed description, the drawings, and the claims.

BRIEF DESCRIPTION OF THE DRAWINGS

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, devices, and/or systems described herein. However, various changes, modifications, and equivalents of the methods, devices, and/or systems described herein will be apparent after an understanding of the disclosure of this application. For example, the sequences of operations described herein are merely examples, and are not limited to those set forth herein, but may be changed with the exception of operations necessarily occurring in a certain order. Also, descriptions of features that are known after understanding of the disclosure of this application may be omitted for increased clarity and conciseness.

Although terms of "first," "second," and "third" may be used to describe various components, members, regions, layers, or sections, these components, members, regions, layers, or sections are not to be limited by these terms (e.g., "first," "second," and "third"). Rather, these terms are only used to distinguish one component, member, region, layer, or section from another component, member, region, layer, or section. Thus, for example, a "first" component, member, region, layer, or section referred to in examples described herein may also be referred to as a "second" component, member, region, layer, or section, and a "second" component, member, region, layer, or section referred to in examples described herein may also be referred to as the "first" component without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween. Likewise, similar expressions, for example, "between" and "immediately between," and "adjacent to" and "immediately adjacent to," are also to be construed in the same.

As used herein, the singular forms "a", "an", and "the" are intended to include the plural forms as well, unless the context clearly indicates otherwise. As used herein, the terms "includes/including," "comprise/comprising," and "have/having" specify the presence of stated features, numbers, operations, elements, components, and/or combinations thereof, but do not preclude the presence or addition of one or more other features, numbers, operations, elements, components, and/or combinations thereof. As used herein, the term "and/or" includes any one and any combination of any two or more of the associated listed items. The use of the term "may" herein with respect to an example or embodiment (for example, as to what an example or embodiment may include or implement) means that one or more examples or embodiments exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

Hereinafter, examples will be described in detail with reference to the accompanying drawings. When describing the examples with reference to the accompanying drawings, like reference numerals refer to like components and a repeated description related thereto will be omitted.

Figure 1:
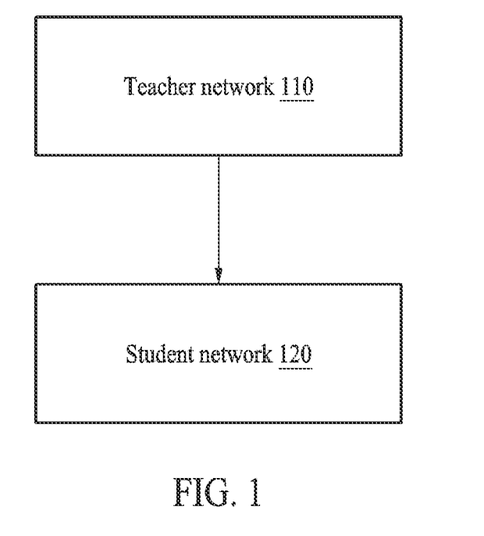
FIG. 1 illustrates an example of a teacher network and a student network.

FIG. 1 illustrates an example of a teacher network and a student network.

Referring to FIG. 1, a teacher network 110 and a student network 120 are illustrated. The teacher network 110 and the student network 120 may include, for example, a neural network as a trained model to output a predetermined output for a predetermined input. The neural network may be a recognition model that includes computational capabilities using a large number of nodes connected by a connection line. The neural network may use nodes that may be interconnected via the connection line with a connection weight. The connection weight, which is a parameter of the neural network, may be a predetermined value of the connection line and may also be expressed as a connection strength. The neural network may perform a function or learning process through the nodes. The neural network may include a plurality of layers. For example, the neural network may include an input layer, a hidden layer (e.g., one or more hidden layers), and an output layer. The input layer may receive an input to perform training and may transmit the input to the hidden layer, and the output layer may generate an output of the neural network based on signals received from nodes of the hidden layer. The hidden layer may be placed between the input layer and the output layer and training data passed through the input layer may be converted into a predictable value. Nodes included in the input layer and the hidden layer may be connected to each other through connection lines having connection weights, and nodes included in the hidden layer and the output layer may also be connected to each other through connection lines having connection weights. Each of the input layer, the hidden layer, and the output layer may include a plurality of nodes. The hidden layer may include a plurality of hidden layers. A neural network including a plurality of hidden layers may be referred to as a deep neural network, and training the deep neural network may be referred to as deep learning. A node included in the hidden layer is referred to as a hidden node. The neural network may be trained through supervised learning. Supervised learning may be a method of inputting input data and corresponding output data to the neural network, and updating connection weights of connection lines so that the output data corresponding to the input data may be output. For example, a model training apparatus may update the connection weights between nodes through a delta rule and backpropagation learning. Backpropagation learning is a method that may estimate a loss by performing forward computation on given input data, propagate the estimated loss in a reverse direction from the output layer to the hidden layer and the input layer, and update the connection weights to reduce the loss. The neural network processing may proceed in the order of the input layer, the hidden layer, and the output layer. However, updating the connection weights in backpropagation learning may be proceeded in the order of the output layer, the hidden layer, and the input layer. Hereinafter, training the neural network may be understood as training parameters of the neural network. In addition, the trained neural network may be understood as a neural network to which trained parameters are applied. The teacher network 110 and the student network 120 may be neural networks of different sizes with the same target to be recognized. The teacher network 110 may be a model that recognizes target data with high accuracy using sufficiently numerous characteristics extracted from the target data to be recognized. The teacher network 110 may be greater in size than the student network 120. For example, the teacher network 110 may include more hidden layers, more nodes, or combinations thereof when compared to the student network 120. The student network 120 may be a neural network having a smaller size than the teacher network 110, and may have a faster recognition rate than the teacher network 110 due to being smaller in size. The student network 120 may be trained based on the teacher network 110 so that output data of the teacher network 110 is output from input data. For example, the output data of the teacher network 110 may be a value of logic output from the teacher network 110, a probability value, and/or an output value of a classification layer derived from a hidden layer of the teacher network 110. Through this process, the student network 120 may acquire a faster recognition rate than the teacher network 110 while outputting the same value as the teacher network 110. This process may be referred to as model compression. Model compression is a technique that may train the student network 120 using output data of the teacher network 110 instead of ground truth data that is a true label. A plurality of teacher networks 110 may be used when the student network 120 is trained. The student network 120 may be trained by selecting at least one of the plurality of teacher networks to train the student network 120. The process of selecting at least one of the plurality of teacher networks and training the student network 120 using the selected at least one teacher network may be repeatedly performed until the student network 120 satisfies a predetermined condition. The at least one teacher network that is selected to train the student network 120 may be newly selected every time the learning process is repeated. For example, one or more teacher network may be selected as a model for training the student network 120. For example, a teacher network may be selected a first time and a different teacher network may be selected a second time.

Figure 2:
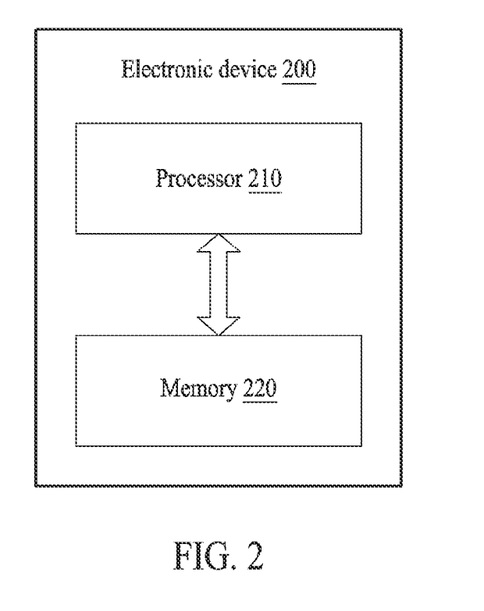
FIG. 2 illustrates an example of a configuration of an electronic device for training a neural network for image processing.

FIG. 2 illustrates an example of a configuration of an electronic device for training a neural network for image processing.

As illustrated in FIG. 2, an electronic device 200 may include a processor 210 (e.g., one or more processors) and a memory 220 (e.g., one or more memories).

The electronic device 200 may correspond to a computing device. For example, the electronic device 200 may be or include a personal computer (PC), a server, a mobile device, and/or the like, but is not limited thereto, and may be or include an autonomous vehicle, a robot, a smart phone, a tablet device, an augmented reality (AR) device, an Internet of Things (IoT) device and/or similar devices, and/or a device installed in an autonomous vehicle, a robot, a smart phone, a tablet device, an AR device, an IoT device and/or similar devices that perform image recognition as part through neural network training, but is not limited thereto, and the electronic device 200 may correspond to various other types of devices.

The memory 220 may store data or information of a processing operation for the electronic device 200. For example, the memory 220 may store training data for training the neural network. The memory 220 may also store instructions to be executed by the processor 210. The memory 220 may include a non-transitory computer-readable storage medium (e.g., random access memory (RAM), dynamic random access memory (DRAM), static RAM (SRAM), a magnetic hard disk, an optical disk, a flash memory, erasable programmable read-only memory (EPROM), or other types of non-transitory computer-readable storage media). The memory 220 may be or include a non-transitory computer-readable storage medium storing instructions that, when executed by the processor 210, configure the processor 210 to perform any one, any combination, or all of the operations and methods described herein with references to FIGS. 1 to 9.

The processor 210 may control overall operations of the electronic device 200 and execute functions and/or instructions of the electronic device 200. The processor 210 may perform a neural network training method for image processing. For example, the processor 210 may generally execute instructions stored in the memory 220 to control the electronic device 200. The electronic device may include, but is not limited to, a central processing unit (CPU), a graphics processing unit (GPU), an application processor (AP), a neural processing unit (NPU), and the like, set in the electronic device 200. The processor 210 may perform any one, any combination, or all of the operations and methods described herein with references to FIGS. 1 to 9.

Figure 3:
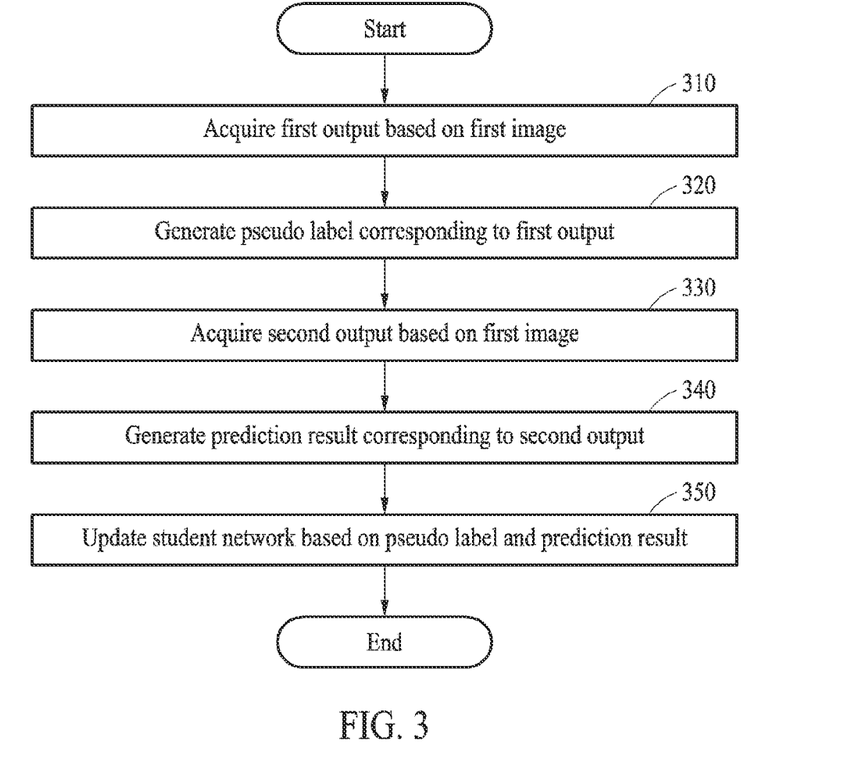
FIG. 3 illustrates an example of a neural network training method for image processing.

FIG. 3 illustrates an example of a neural network training method for image processing.

Operations 310 through 350 to be described hereinafter may be performed in sequential order, but may not be necessarily performed in sequential order. For example, the operations 310 through 350 may be performed in different orders, and at least two of the operations 310 through 350 may be performed in parallel or simultaneously. Further, one or more of operations 310 through 350 may be omitted, without departing from the spirit and scope of the shown example. The operations 310 through 350 to be described hereinafter with reference to FIG. 3 may be performed by one or more components (e.g., the processor 210 of FIG. 2) of an electronic device (e.g., the electronic device 200 of FIG. 2) described herein, and in addition to the description of FIG. 3 below, the descriptions of FIGS. 1 and 2 are also applicable to FIG. 3 and are incorporated herein by reference.

Referring to FIG. 3, in operation 310, an electronic device for training a neural network for image processing (e.g., the electronic device 200 of FIG. 2, as a non-limiting example) may acquire (e.g., generate) first outputs of each of at least two (e.g., two or more) layers of a teacher network based on a first image. For example, the first image may be an image acquired from an ImageNet database. However, the example is not limited thereto, and the first image may be acquired from another arbitrary database or by using various other methods.

In operation 310, the electronic device for training the neural network for image processing may input each second image acquired based on the first image to the teacher network, and acquire the first outputs of each layer among the at least two layers of the teacher network corresponding to each second image. For example, the second image may be the first image. In this example, the electronic device may acquire the first outputs of each layer of the at least two layers of the teacher network by inputting the first image to the teacher network. In an example, the electronic device may generate at least one second image (e.g., one or more second images) by performing weak enhancement processing only on the first image. In an example, the electronic device may generate a plurality of second images by performing additional processing on the weakly enhanced first image. Hereinafter, a non-limiting example of generating a second image by performing additional processing on a first image after weak enhancement processing is performed is described with reference to FIG. 3. The enhancement processing performed on an image may include, for example, any one or any combination of any two or more of random cropping, image scaling, color changing, random gray scale changing, Gaussian blurring, random flipping, and the like, but is not limited thereto.

In operation 320, the electronic device may generate a pseudo label corresponding to each first output based on the first outputs. In an example, the electronic device may generate a pseudo label corresponding to each first output based on a similarity between each first output and a historical (e.g., a previous) output of a layer of the teacher network corresponding to each first output. The historical output of each layer of the teacher network may include an output generated in each layer of the teacher network by historically executing the teacher network (e.g., by previously executing the teacher network). However, the example is not limited thereto, and the electronic device may generate a pseudo label corresponding to each first output via another method. In an example, the electronic device may generate a pseudo label corresponding to each first output of each second image based on a similarity between each first output corresponding to each second image and a historical output of a corresponding layer among at least two layers.

In operation 330, the electronic device may acquire a second output processed by at least one layer in a student network including an output layer based on the first image. The electronic device may input each third image acquired based on the first image to the student network and acquire an output of each layer of the student network including at least one layer of an output layer corresponding to each third image, and merge the output of each layer corresponding to each third image into a second output corresponding to each third image (for example, the output of each layer corresponding to each third image may be connected to the second output corresponding to each third image). For example, the electronic device may merge the output of the output layer and the output of the at least one layer adjacent to or connected to the same output layer to generate the second output corresponding to the one third image. According to some examples, the third image may be the first image. For example, the electronic device may acquire an output of each layer including at least one layer of the output layer in the student network by inputting the first image to the student network.

In an example, in operation 330, the electronic device may generate at least one third image by performing strong enhancement processing only on the first image. In an example, the electronic device may generate a plurality of third images by performing additional processing on the first image after performing the strong enhancement processing. Hereinafter, a non-limiting example of generating a plurality of third images by performing additional processing on the first image after performing the strong enhancement processing is described with reference to FIG. 3. In an example, the number (e.g., the total number or quantity) of second images may be the same as the number of third images.

In operation 340, the electronic device may generate a prediction result corresponding to each layer of at least two layers based on each of the second outputs. The electronic device may generate a prediction result corresponding to each layer of at least two layers based on a similarity between a historical output corresponding to each layer of at least two layers of the teacher network and each of the second outputs. However, the example is not limited thereto, and the electronic device may generate the pseudo label and the prediction result using other methods, and the present disclosure is not particularly limited thereto. In an example, the electronic device may generate a prediction result corresponding to each layer of at least two layers of each third image, based on a similarity between the historical output corresponding to each layer of the at least two layers of the teacher network and the second outputs corresponding to each third image.

In operation 350, the electronic device may update the student network based on the pseudo label and the prediction result. For example, the electronic device may determine a loss based on the pseudo label and the prediction result, and use the determined loss to update parameters of the student network, thereby minimizing the determined loss or lowering the determined loss by more than a predetermined threshold based on the updated parameters of the student network (for example, operations 330 to 340 may be performed again based on the updated parameters of the student network to re-acquire the prediction result and to determine the loss based on the pseudo label and the re-acquired prediction result). For example, the loss may include a difference between each pseudo label and the prediction result corresponding to each same pseudo label. Each pseudo label and the prediction result corresponding to each same pseudo label may correspond to the same layer among at least two layers in the teacher network.

In an example, when the second image and the third image are the first image, or the electronic device generates the second image by performing weak enhancement processing only on the first image and generates the third image by performing strong enhancement processing only on the first image, the electronic device may determine the loss based on a difference between each prediction result of each third image and a pseudo label corresponding to each prediction result of one second image. In order to improve the accuracy of training, instead of a method of calculating (e.g., determining) a loss with one label and one prediction result, the electronic device of one or more embodiments may be configured to implement a method of calculating a loss with a plurality of labels and a plurality of corresponding prediction results. For example, when three layers (layer T1, layer T2, and layer T3) of the teacher network are selected based on one image 1 input to the teacher network, the first outputs of layer T1, layer T2 and layer T3 of the teacher network, respectively, may be acquired, and according to the first outputs of layer T1, layer T2 and layer T3 and the historical outputs of the three layers, the pseudo labels of image 1 corresponding to the three layers, respectively, may be calculated. Based on image 1 input to the student network, when layer S1 and an output layer are selected, and when each of the outputs of layer S1 and the output layer are acquired, the outputs of layer S1 and the output layer may be merged to acquire a second output of image 1. Then, by using the second output of image 1, the historical outputs of layer T1, layer T2 and layer T3 of the teacher network, respectively, may be calculated, and prediction result 1, prediction result 2 and prediction result 3 corresponding to layer T1, layer T2 and layer T3, respectively, may be acquired. The electronic device may apply the same processing method to a plurality of images. In an example, the electronic device may calculate a difference between a prediction result and a pseudo label using KL divergence. However, the example is not limited thereto, and another method may be used to calculate a difference between a prediction result and a pseudo label. In an example, when the electronic device generates a second image by performing additional processing on a first image after performing the weak enhancement processing, and generates a third image by performing additional processing on the first image after performing the strong enhancement processing, the electronic device may acquire a final pseudo label based on the pseudo label generated in operation 320, and determine a loss based on a difference between the prediction result and the final pseudo label. A non-limiting example of such will be further described with reference to FIG. 8 below.

Figure 4:
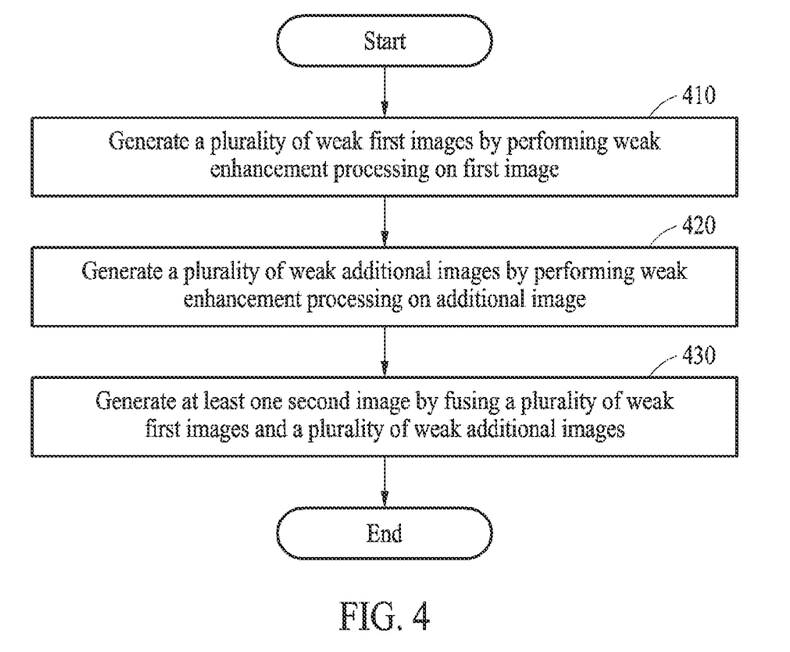
FIG. 4 illustrates an example of a method of generating a second image in a neural network training method for image processing.

FIG. 4 illustrates an example of a method of generating a second image in a neural network training method for image processing. Operations 410 through 430 to be described hereinafter may be performed in sequential order, but may not be necessarily performed in sequential order. For example, the operations 410 through 430 may be performed in different orders, and at least two of the operations 410 through 430 may be performed in parallel or simultaneously. Further, one or more of operations 410 through 430 may be omitted, without departing from the spirit and scope of the shown example. The operations 410 through 430 to be described hereinafter with reference to FIG. 4 may be performed by one or more components (e.g., the processor 210 of FIG. 2) of an electronic device (e.g., the electronic device 200 of FIG. 2) described herein, and in addition to the description of FIG. 4 below, the descriptions of FIGS. 1 through 3 are also applicable to FIG. 4 and are incorporated herein by reference.

Referring to FIG. 4, an electronic device may generate a second image by fusing a first image on which enhancement processing has been performed and an additional image on which enhancement processing has been performed. in operation 410, the electronic device may generate a plurality of weak first images by performing weak enhancement processing on the first image. In operation 420, the electronic device may acquire an additional image. For example, the additional image may be different from the first image. For example, the first image and the additional image may be images acquired from an ImageNet database, from another arbitrary database, and/or by using various other methods.

In operation 420, the electronic device may generate a plurality of weak additional images by performing weak enhancement processing on the additional image.

In operation 430, the electronic device may generate a plurality of second images by performing one-to-one image fusion on the plurality of weak first images and the plurality of weak additional images. For example, the electronic device may adjust a size of each weak additional image by the product of a size of the corresponding weak first image to be fused and a predetermined ratio, and generate a plurality of second images by overlapping each weak additional image after performing resizing on a predetermined area (for example, an image of the predetermined area of the first image may be replaced with the processed additional image) of the corresponding weak first image to be fused. For example, the predetermined ratio may be less than 0.5.

Figure 5:
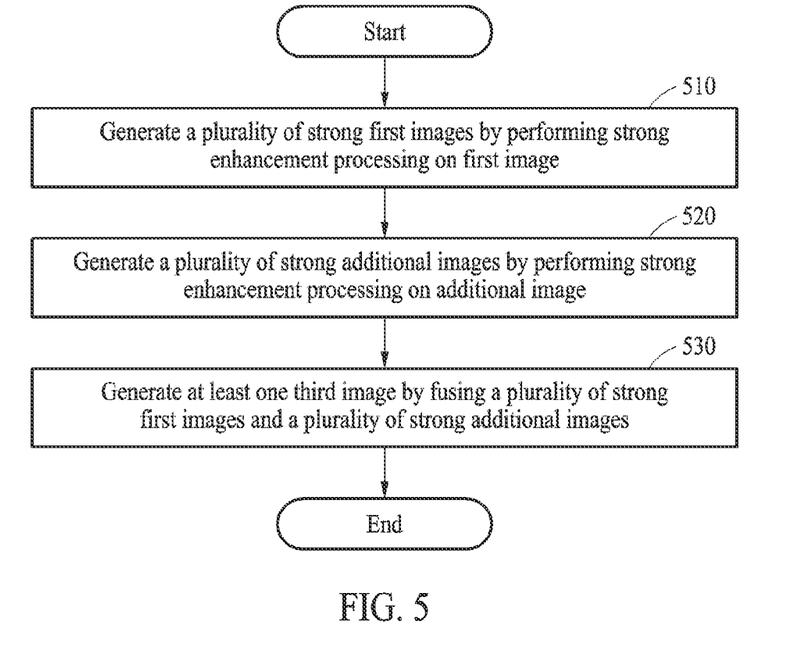
FIG. 5 illustrates an example of a method of generating a third image in a neural network training method for image processing.

FIG. 5 illustrates an example of a method of generating a third image in a neural network training method for image processing. Operations 510 through 530 to be described hereinafter may be performed in sequential order, but may not be necessarily performed in sequential order. For example, the operations 510 through 530 may be performed in different orders, and at least two of the operations 510 through 530 may be performed in parallel or simultaneously. Further, one or more of operations 510 through 530 may be omitted, without departing from the spirit and scope of the shown example. The operations 510 through 530 to be described hereinafter with reference to FIG. 5 may be performed by one or more components (e.g., the processor 210 of FIG. 2) of an electronic device (e.g., the electronic device 200 of FIG. 2) described herein, and in addition to the description of FIG. 4 below, the descriptions of FIGS. 1 through 4 are also applicable to FIG. 5 and are incorporated herein by reference.

Referring to FIG. 5, an electronic device may generate a plurality of third images by fusing a first image on which enhancement processing has been performed and an additional image on which enhancement processing has been performed. In operation 510, the electronic device may generate a plurality of strong first images of different sizes by performing strong enhancement processing on a first image. In operation 520, the electronic device may generate a plurality of strong additional images of different sizes by performing strong enhancement processing on an additional image.

In operation 530, the electronic device may generate a plurality of third images by performing one-to-one image fusion on the plurality of strong first images and the plurality of strong additional images. For example, the electronic device may adjust a size of each strong additional image by the product of a size of the corresponding strong first image to be fused and a predetermined ratio, and generate a plurality of third images by overlapping each strong additional image after performing resizing on a predetermined area (for example, an image of the predetermined area of the corresponding strong first image to be fused may be replaced with each resized, strong additional image) of the corresponding strong first image to be fused. In an example, there may be two or more of the strong first image, the strong additional image and the third image, respectively. In an example, through image enhancement performed on an original sample and image fusion performed on an enhanced image, the electronic device of one or more embodiments may generate sufficient training samples to increase the difficulty of training, may improve the accuracy of neural network training for image processing, and may solve the problems of reliance on large amounts of samples and need for large-scale hardware resources occurring in a typical electronic device. In an example, the noise of a pseudo label may be reduced by inputting samples with different degrees of enhancement to the teacher network and the student network. An example of an image fusion method has been described, but the present disclosure is not limited thereto, and other existing image fusion methods may be used.

Figure 6:
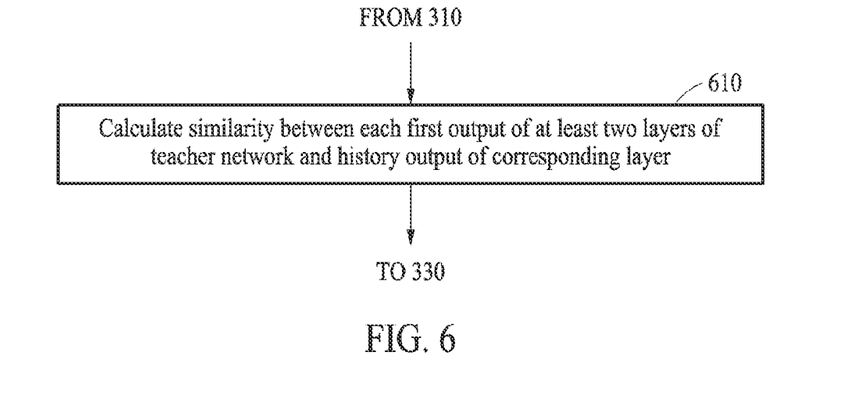
FIG. 6 illustrates an example of a method of generating a pseudo label in a neural network training method for image processing.

FIG. 6 illustrates an example of a method of generating a pseudo label in a neural network training method for image processing. Operation 610 may be performed by one or more components (e.g., the processor 210 of FIG. 2) of an electronic device (e.g., the electronic device 200 of FIG. 2) described herein, and in addition to the description of FIG. 6 below, the descriptions of FIGS. 1 through 5 are also applicable to FIG. 6 and are incorporated herein by reference.

Referring to FIG. 6, in operation 610, an electronic device may calculate a similarity between a first output of each layer of at least two layers of a teacher network and a historical output of a corresponding layer of the at least two layers of the teacher network.

For example, the electronic device may calculate a first similarity between a first output of a first predetermined layer among at least two layers of the teacher network and a historical output of the first predetermined layer of the teacher network, and similarly, the electronic device may calculate a similarity between a first output of each of remaining layers of the at least two layers of the teacher network and a historical output of the corresponding layer of the remaining layers of the at least two layers of the teacher network. For example, the historical output of the first predetermined layer of the at least two layers of the teacher network may include an output generated from the first predetermined layer of the teacher network by previously executing the teacher network. In an example, the electronic device may calculate the Euclidean distance between the first output of each layer of the at least two layers of the teacher network and the historical output of the corresponding layer of the at least two layers of the teacher network, respectively, to calculate the similarity between the first output of each layer of the at least two layers of the teacher network and the historical output of the corresponding layer of the at least two layers of the teacher network, respectively. For example, the electronic device may calculate a first Euclidean distance between the first output of the first predetermined layer among the at least two layers of the teacher network and each historical output of the first predetermined layer of the teacher network as the first similarity.

In operation 610, the electronic device may perform momentum normalization on the similarity between the first output of each layer of the at least two layers of the teacher network and the historical output of the corresponding layer of the at least two layers of the teacher network, respectively, so that pseudo labels corresponding to each of the first outputs may be generated. For example, the electronic device may generate a first pseudo label corresponding to the first output of the first predetermined layer among the at least two layers of the teacher network by performing momentum normalization on the first similarity. In an example, the electronic device may normalize the first Euclidean distance using either one or both of a first parameter determined based on a statistical value of the first Euclidean distance and a second parameter determined based on an extreme value of the first Euclidean distance.

The first parameter may be calculated by Equation 1 below, for example.

$$M1=(1-M) \times M2 + M \times M3 \qquad \text{Equation 1:}$$

In Equation 1, M1 may denote the first parameter, M2 may denote a statistical value of the first Euclidean distance, M3 may denote a statistical value of the first Euclidean distance calculated from a past output generated in the first predetermined layer of the teacher network during a previous execution of the teacher network, and M may denote a predetermined momentum value.

The second parameter may be calculated by Equation 2 below, for example.

$$L1=(1-M) \times L2 + M \times L3 \qquad \text{Equation 2:}$$

In Equation 2, L1 may denote the second parameter, L2 may denote an extreme value of the first Euclidean distance, and M3 may denote an extreme value of the first Euclidean distance calculated from a past output generated in the first predetermined layer of the teacher network during a previous execution of the teacher network. In an example, the statistical value of the first Euclidean distance may be a mean or a variance of the first Euclidean distance, and the extreme value of the first Euclidean distance may be a maximum value or a minimum value of the first Euclidean distance. For example, the electronic device may perform Min-Max normalization, mean variance normalization, or minimum normalization on the first Euclidean distance, and using such method may determine parameters for performing Min-Max normalization, mean variance normalization, or minimum normalization.

For example, when the electronic device performs minimum normalization on the similarity or Euclidean distance, the electronic device may calculate a pseudo label through Equation 3 below, for example.

$$Pij = \frac{(Aij - \text{Mean } Ai)}{\text{Min } Ai} \qquad \text{Equation 3}$$

In Equation 3, Aij may denote an ij-th Euclidean distance between a first output of an i-th predetermined layer in the teacher network and a j-th output generated in the i-th predetermined layer by previously executing a j-th teacher network, Pij may denote an ij-th probability value corresponding to the ij-th Euclidean distance among pseudo labels corresponding to the first output of the i-th predetermined layer, MeanAi may denote a first parameter determined based on a mean of a Euclidean distance determined by the first output of the i-th predetermined layer and each historical output of the i-th predetermined layer, and MinAi may denote a second parameter determined based on a minimum value of a Euclidean distance determined by the first output of the i-th predetermined layer and each historical output of the i-th predetermined layer.

In an example, the electronic device of one or more embodiments may generate pseudo labels of images having different semantic levels, improve the quality of generated pseudo labels of images, and improve the accuracy of student network training, by generating pseudo labels of images based on outputs of different layers of the teacher network. The electronic device of one or more embodiments may improve the stability of training the student network through the momentum normalization method, and may reduce the inaccuracy in the training process compared to a typical electronic device. An example of a method of generating a pseudo label has been described above, but the present disclosure is not limited thereto, and other existing methods for generating a pseudo label may be used.

Figure 7:
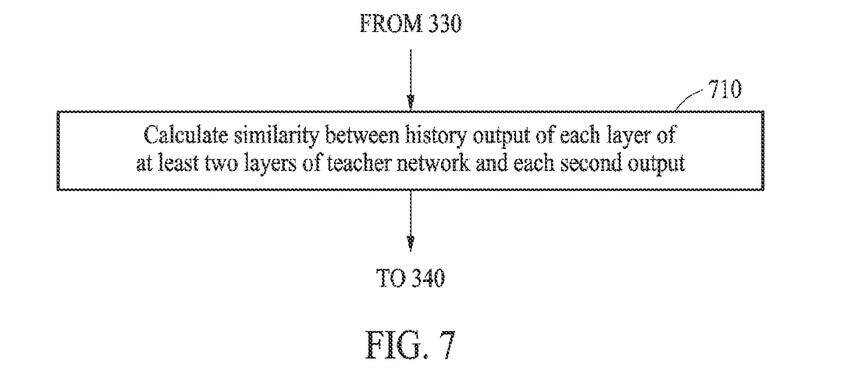
FIG. 7 illustrates an example of a method of generating a prediction result in a neural network training method for image processing.

FIG. 7 illustrates an example of a method of generating a prediction result in a neural network training method for image processing. Operation 710 may be performed by one or more components (e.g., the processor 210 of FIG. 2) of an electronic device (e.g., the electronic device 200 of FIG. 2) described herein, and in addition to the description of FIG. 7 below, the descriptions of FIGS. 1 through 6 are also applicable to FIG. 7 and are incorporated herein by reference.

Referring to FIG. 7, in operation 710, an electronic device may calculate a similarity between a historical output of each layer of at least two layers of a teacher network and each second output. In an example, the electronic device may acquire an output of at least one layer in a student network including an output layer by inputting each third image to the student network, and the output of the at least one layer may be merged into a second output corresponding to each third image. In an example, the electronic device may acquire an output of at least one layer in the student network including an output layer by inputting one third image to the student network. In this example embodiment, the at least one layer in the student network including the output layer may be adjacent to another layer. That is, the at least one layer may be consecutive layers. In an example, the electronic device may acquire the output of the output layer in the student network, or acquire the output of the output layer in the student network and the output of at least one layer adjacent to or connected to the output layer.

In an example, when the electronic device acquires only the output of the output layer in the student network, the electronic device may determine the output of the output layer to be the second output corresponding to one third image. When the electronic device acquires the output of the output layer and the output of at least one layer adjacent or connected to the output layer, the electronic device may merge the output of the output layer and the output of the at least one layer adjacent to or connected to the same output layer to generate the second output corresponding to the one third image. For example, the electronic device may merge the output of the at least one layer adjacent to or connected to the output layer and the output of the output layer according to an order of the at least one layer adjacent to or connected to the output layer and the output layer of the student network. For example, when the output layer is an nth layer of the student network, the at least one layer adjacent to or connected to the output layer is an n−1th layer of the student network, and the output of the nth layer is $(m_1, \ldots, m_x)$ and the output of the n−1th layer is $(x_1, \ldots, x_s)$, a result (e.g., the second output) of merging the output of the output layer and the output of the at least one layer adjacent to the same output layer may be $(x_1, \ldots, x_s, m_1, \ldots, m_x)$ (where s and x may each be an integer greater than 1). The electronic device may generate prediction results respectively corresponding to at least two layers based on the second output corresponding to each third image. In an example, as a prediction result corresponding to at least two layers of each third image, the electronic device may calculate a similarity between a historical output of each layer of at least two layers in the teacher network and a second output corresponding to each third image. For example, as one prediction result corresponding to at least two layers of each third image, the electronic device may calculate a similarity between a historical output of each layer of at least two layers of the teacher network and a second output corresponding to a third image. When a dimension of the historical output of each layer of the at least one layer among the at least two layers may be different from a dimension of the second output corresponding to each third image, the similarity calculated between the historical output of each layer of the at least one layer of the at least two layers and the second output corresponding to each third image may be inaccurate. Accordingly, the electronic device may transform the dimension of the historical output of each layer of the at least one layer among the at least two layers. For example, when the dimension of the second output corresponding to each third image is different from the dimension of the historical output of each layer of the at least one layer among the at least two layers of the teacher network, the electronic device may transform the dimension of the historical output of each layer of the at least one of the at least two layers in the teacher network into a dimension that is the same as the dimension of the second output corresponding to each third image. In addition, the electronic device may calculate a similarity between the historical output of each layer of the at least one of the at least two layers of the transformed teacher network and the second output corresponding to each third image as a prediction result of each third image corresponding to at least one layer of the at least two layers of the teacher network. For example, when the dimension of the second output corresponding to each third image is different from the dimension of the historical output of a first predetermined layer among the at least two layers of the teacher network, the electronic device may transform the dimension of the historical output of the first predetermined layer into a dimension that is the same as the dimension of the second output corresponding to each third image, and calculate the similarity between the historical output of the first predetermined layer after the transformation and the second output corresponding to each third image as a prediction result of each third image corresponding to the first predetermined layer.

In an example, the electronic device may calculate an inner product between the historical output of each layer of the at least two layers of the teacher network and the second output corresponding to each third image, to obtain (e.g., determine) the similarity between the historical output of each layer of the at least two layers of the teacher network and the second output corresponding to each third image. However, the example embodiment is not limited thereto, and the electronic device may calculate the similarity between the historical output of each layer of the at least two layers of the teacher network and the second output corresponding to each third image by calculating the Euclidean distance between the historical output of each layer of the at least two layers of the teacher network and the second output corresponding to each third image, or via a different method.

An example of a method of generating a prediction result has been described, but the present disclosure is not limited thereto, and other existing methods for generating a prediction result may be used.

Figure 8:
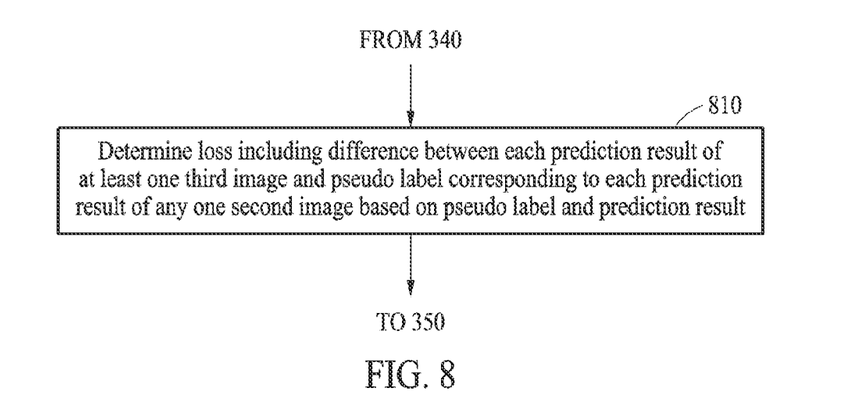
FIG. 8 illustrates an example of a method of updating a student network in a neural network training method for image processing.

FIG. 8 illustrates an example of a method of updating a student network in a neural network training method for image processing. Operation 810 may be performed by one or more components (e.g., the processor 210 of FIG. 2) of an electronic device (e.g., the electronic device 200 of FIG. 2) described herein, and in addition to the description of FIG. 8 below, the descriptions of FIGS. 1 through 7 are also applicable to FIG. 8 and are incorporated herein by reference.

Referring to FIG. 8, in operation 810, an electronic device may determine a loss including a difference between each prediction result of at least one third image and a pseudo label corresponding to each prediction result of any one second image, based on the pseudo label and the prediction result.

In operation 810, the electronic device may adjust a size of each weak first image by a product of a size of a corresponding weak additional image to be fused and a predetermined ratio, and generate an intermediate image corresponding to each second image by overlapping each weak first image after performing resizing on a predetermined area of the corresponding weak additional image to be fused. For example, each second image and intermediate image corresponding to each second image may be generated based on the same weak first image and weak additional image. The electronic device may input each intermediate image to a teacher network to acquire a third output of each layer of at least two layers of the teacher network corresponding to each intermediate image. The electronic device may generate a pseudo label corresponding to each third output based on each third output. In an example, the electronic device may generate a pseudo label corresponding to each third output in a manner similar to the manner in which the electronic device generates a pseudo label corresponding to each first output. In an example, the electronic device may generate a final pseudo label corresponding to each first output by fusing a pseudo label corresponding to each first output and a pseudo label corresponding to each third output.

In an example, the electronic device may generate the final pseudo label by using Equation 4 below, for example.

$$Yij=(1-r)\times Yaij+r\times Ybij \quad \text{Equation 4:}$$

In Equation 4, Yij may denote a final pseudo label corresponding to a j-th layer of at least two layers of an i-th second image among a plurality of second images, r may denote a predetermined ratio, Yaij may denote a pseudo label corresponding to a j-th first output of at least two layers of the i-th second image, and Ybij may denote a pseudo label corresponding to a third output of a j-th layer of at least two layers of an intermediate image corresponding to the i-th second image.

In an example, the electronic device may determine a loss based on a difference between a prediction result and a final pseudo label. For example, the loss may include a difference between each final pseudo label and each prediction result corresponding to each same final pseudo label. Each final pseudo label and each prediction result corresponding to the same respective final pseudo label may respectively correspond to the same layer of at least two layers. For example, the electronic device may calculate a difference between a prediction result and a pseudo label using KL divergence. However, the example embodiment is not limited thereto, and another method may be used to calculate a difference between a prediction result and a pseudo label.

For example, in at least one third image generated by the electronic device performing strong enhancement processing on a first image, at least two third images may have the same size and the other third images may have different sizes. When a total loss for updating the student network is determined based on a direct sum of the losses corresponding to each third image, the student network training may be less accurate. Accordingly, to correct for such inaccuracy, the electronic device of one or more embodiments may determine the total loss used for updating the student network via the following method. For example, the electronic device may acquire a mean of a loss corresponding to the third image of an i-th size among the losses as an i-th loss corresponding to the third image of the i-th size. For example, i may be an integer from 1 to n, and n may be an integer greater than 1 indicating the number of sizes of a plurality of third images. The electronic device may update the student network by calculating the sum of a first loss and an n-th loss as a total loss. For example, when the plurality of third images includes a third image (a), a third image (b), and a third image (c), and the sizes of the third image (a) and the third image (b) are a first size and the size of the third image (c) is a second size, the electronic device may obtain a mean of a loss of the third image (a) and the third image (b) as a loss corresponding to the third image of the first size, determine a loss corresponding to the third image (c) as a loss corresponding to the third image of the second size, and determine a sum of a mean of the losses of the third image (a) and the third image (b) and the loss corresponding to the third image (c) as the total loss. However, the sizes of the plurality of third images are not limited to a particular example embodiment, and the plurality of third images may have one size or at least three sizes. It will be understood, after an understanding of the present disclosure, that various known methods may be used to update the student network based on the total loss, and the present disclosure is not in any way limited thereto.

Figure 9:
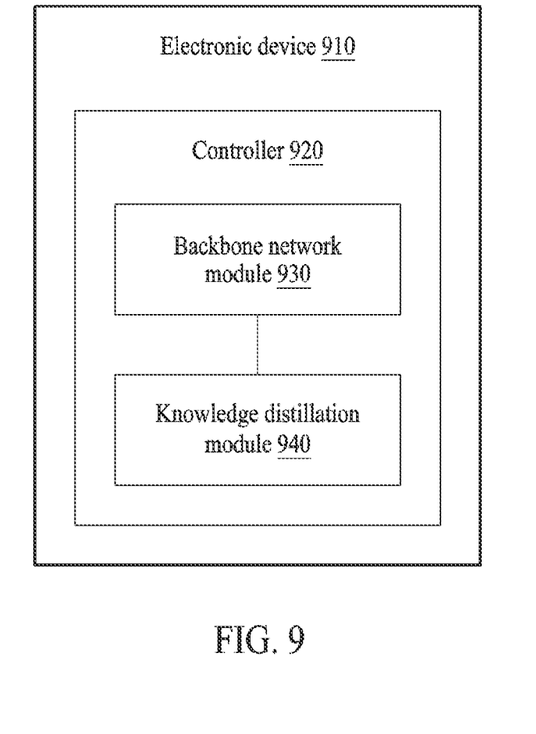
FIG. 9 illustrates an example of an electronic device.

FIG. 9 illustrates an example of an electronic device.

Referring to FIG. 9, an electronic device 910 may include a controller 920. It will be understood, after an understanding of the present disclosure, that the electronic device 910 may further include other components and components included in the electronic device 910 may be separated or combined. In a non-limiting example, the electronic device 910 may be or correspond to the electronic device 200 of FIG. 2, and the controller 920 may be or correspond to the processor 210 of FIG. 2. In an example, the controller 920 may process a neural network for image processing (e.g., using the method of training the neural network for image processing illustrated in FIG. 3). For example, the controller 920 may include a backbone network module 930 and a knowledge distillation module 940.

The backbone network module 930 may include a backbone network including a teacher network (the teacher network 110 of FIG. 1, as a non-limiting example) and a student network (the student network 120 of FIG. 1, as a non-limiting example), wherein the backbone network module 930 may be configured to acquire a first output of each layer of at least two layers of the teacher network based on a first image.

For example, the first image may be acquired from an ImageNet database. However, the example is not limited thereto, and the first image may be acquired from another arbitrary database or by using various other methods. The backbone network module 930 may input each second image acquired based on the first image to the teacher network, and acquire a first output of each second image corresponding to each layer of at least two layers of the teacher network. In an example, the second image may be the first image. In this example embodiment, the backbone network module 930 may input the first image to the teacher network and acquire a first output of each layer of at least two layers of the teacher network. In an example, the electronic device 910 (e.g., the controller 920 of the electronic device 910) may further include an image processing module, and the image processing module may perform weak enhancement processing only on the first image to generate at least one second image. In an example, the image processing module may be included in or be separate from the backbone network module 930.

In an example, the image processing module may generate a plurality of second images by performing additional processing on the first image after performing the weak enhancement processing. Since an example of generating a second image by performing additional processing on a first image after performing weak enhancement processing has been described with reference to FIG. 4, any repeated description related thereto will be omitted.

The enhancement processing performed on an image may include, for example, any one or any combination of random cropping, image scaling, color changing, random gray scale changing, Gaussian blurring, random flipping, and the like, but is not limited thereto.

The backbone network module 930 may generate a pseudo label corresponding to each first output based on each first output. In an example, the backbone network module 930 may generate a pseudo label corresponding to each first output of each second image based on a similarity between each first output corresponding to each second image and a historical output of a corresponding layer of at least two layers. The backbone network module 930 may acquire a second output processed in at least one layer in the student network including an output layer based on the first image. The backbone network module 930 may input each third image acquired based on the first image to the student network and obtain an output of each layer of the student network including at least one layer of an output layer corresponding to each third image, and merge the output of each layer corresponding to each third image into a second output corresponding to each third image (for example, the output of each layer corresponding to each third image may be connected to the second output corresponding to each third image). In an example, the third image may be the first image. In this example embodiment, the backbone network module 930 may input the first image to the student network to acquire an output of each layer of the corresponding student network including at least one layer of the output layer. In an example, the image processing module may generate at least one third image by performing strong enhancement processing only on the first image. In an example, the image processing module may generate a plurality of third images by performing additional processing on the first image after performing the strong enhancement processing. Since an example of generating a plurality of third images by performing additional processing on the first image after performing the strong enhancement processing has been described above with reference to FIG. 5, any repeated description related thereto will be omitted.

In an example, the number of second images may be the same as the number of third images.

The backbone network module 930 may generate a prediction result corresponding to each layer of at least two layers based on each second output.

The backbone network module 930 may generate a prediction result corresponding to each layer of at least two layers based on a similarity between a historical output corresponding to each layer of at least two layers of the teacher network and each of the second outputs.

However, the example embodiment is not limited thereto, and the backbone network module 930 may generate a pseudo label and a prediction result using other methods, and the present disclosure is not particularly limited thereto.

In an example, the backbone network module 930 may generate a prediction result corresponding to each layer of at least two layers of each third image, based on a similarity between the historical output corresponding to each layer of the at least two layers of the teacher network and the second outputs corresponding to each third image.

The knowledge distillation module 940 may update the student network based on the pseudo labels and prediction results.

The knowledge distillation module 940 may determine a loss based on the pseudo label and the prediction result, and use the determined loss to update parameters of the student network, to minimize the determined loss or lower the determined loss by more than a predetermined threshold based on the updated parameters of the student network (for example, the prediction result may be re-acquired based on the updated parameters of the student network, and the loss may be determined based on the pseudo label and the re-acquired prediction result).

For example, the loss may include a difference between each pseudo label and the prediction result corresponding to each same pseudo label. Each pseudo label and the prediction result corresponding to each same pseudo label may all correspond to the same layer among at least two layers in the teacher network.

In an example, when the second image and the third image are the first image, or the image processing module generates the second image by performing weak enhancement processing only on the first image and generates the third image by performing strong enhancement processing only on the first image, the knowledge distillation module 940 may determine the loss based on a difference between each prediction result of each third image and a pseudo label corresponding to each prediction result of one second image.

In an example, KL divergence may be used to calculate a difference between a prediction result and a pseudo label. However, the example embodiment is not limited thereto, and another method may be used to calculate a difference between a prediction result and a pseudo label.

In an example, when the image processing module generates a second image by performing additional processing on a first image after performing the weak enhancement processing, and generates a third image by performing additional processing on the first image after performing the strong enhancement processing, the knowledge distillation module 940 may acquire a final pseudo label based on the pseudo label corresponding to each first output, and determine a loss based on a difference between the prediction result and the final pseudo label. In this regard, since a detailed description has been provided with reference to FIG. 8 above, any repeated description related thereto will be omitted.

The electronic devices, processors, memories, controllers, backbone network modules, knowledge distillation modules, electronic device 200, processor 210, memory 220, electronic device 910, controller 920, backbone network module 930, knowledge distillation module 940, and other apparatuses, units, modules, devices, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
    generating a first output of each of two or more layers of a teacher network, based on a first image;
    generating pseudo labels respectively corresponding to the first outputs, based on the first outputs;
    generating a second output using one or more layers of a student network comprising an output layer, based on the first image;
    generating prediction results respectively corresponding to the two or more layers of the teacher network, based on the second output; and
    training the student network by updating the student network based on the pseudo labels and the prediction results.

2. The method of claim 1, wherein the generating of the first output of each of the two or more layers of the teacher network comprises:
    generating one or more second images by performing weak enhancement processing on the first image;
    generating one or more third images by performing strong enhancement processing on the first image; and
    based on the one or more second images, generating the first output of each of the two or more layers of the teacher network corresponding to the one or more second images,
    wherein a number of the one or more second images and a number of the one or more third images are the same.

3. The method of claim 2, wherein the generating of the second output comprises:
based on the one or more third images, generating an output of each layer of the one or more layers of the student network comprising the output layer corresponding to the one or more third images, and generating the second output by merging the output of each layer corresponding to the one or more third images into the corresponding second outputs.

4. The method of claim 2, wherein the generating of the one or more second images comprises:
generating a plurality of weak first images by performing weak enhancement processing on the first image;
generating a plurality of weak additional images by performing weak enhancement processing on an additional image; and
generating the one or more second images by fusing the plurality of weak first images and the plurality of weak additional images.

5. The method of claim 4, wherein the generating of the one or more second images by fusing the plurality of weak first images and the plurality of weak additional images comprises:
adjusting a size of each the weak additional images by a product of a predetermined ratio and a size of a corresponding one of the weak first images; and
generating the one or more second images by overlapping each of the weak additional images, comprising the adjusted size, onto a predetermined area of the corresponding one of the weak first images.

6. The method of claim 2, wherein the generating of the one or more third images comprises:
generating a plurality of strong first images by performing strong enhancement processing on the first image;
generating a plurality of strong additional images by performing strong enhancement processing on an additional image; and
generating the one or more third images by fusing the plurality of strong first images and the plurality of strong additional images,
and wherein the plurality of strong first images each have a size different from a size of the first image.

7. The method of claim 1, wherein the generating of the pseudo labels comprises:
determining a similarity between the first output of each of the two or more layers of the teacher network and a previous output of a corresponding layer of the two or more layers of the teacher network; and
generating the pseudo labels based on the determined similarities.

8. The method of claim 7, wherein the determining of the similarities comprises determining a Euclidean distance between each of the first outputs and the previous output of the corresponding layer as the similarities.

9. The method of claim 8, wherein the generating of the pseudo label further comprises:
generating intermediate images respectively corresponding to second images by resizing each of weak first images and overlapping each of the weak first images in response to performing resizing on a corresponding predetermined area;
generating a third output of each layer of the two or more layers of the teacher network corresponding to the intermediate image corresponding to each of the second images;
generating pseudo labels respectively corresponding to the third outputs based on the third outputs; and
generating final pseudo labels respectively corresponding to the first outputs by fusing the pseudo labels respectively corresponding to the first outputs and the pseudo labels respectively corresponding the third outputs,
wherein each of the second images and the intermediate image corresponding to each of the second images are generated based on the same weak first image and weak additional image.

10. The method of claim 9, wherein the generating of the final pseudo labels comprises:
generating the final pseudo labels based on a predetermined ratio, pseudo label respectively corresponding to the first outputs of each of the second images, and a pseudo label respectively corresponding to the third outputs of the intermediate image corresponding to each of the second images.

11. The method of claim 1, wherein the generating of the prediction results comprises:
generating the prediction result by determining a similarity between a previous output of each layer of the two or more layers of the teacher network and the second outputs as the prediction result corresponding to each layer of the two or more layers.

12. The method of claim 1, wherein the updating of the student network comprises:
determining a loss comprising a difference between each prediction result of one or more third images and a corresponding pseudo label of any one second image based on the corresponding pseudo label and the prediction result; and
updating the student network based on the determined loss.

13. The method of claim 12, wherein the determining of the loss further comprises:
determining, as the loss, a sum of a loss corresponding to a third image of a first size and a loss corresponding to a third image of a second size.

14. The method of claim 1, wherein one or more layers in the student network comprising the output layer is adjacent to another layer.

15. A non-transitory computer-readable storage medium storing instructions that, when executed by a processor, configure the processor to perform the method of claim 1.

16. An electronic device, the electronic device comprising:
a processor configured to:
generate a first output of each of two or more layers of a teacher network based on a first image;
generate pseudo labels respectively corresponding to the first outputs, based on the first outputs;
generate a second output using one or more layers of a student network comprising an output layer, based on the first image;
generate prediction results respectively corresponding to the two or more layers of the teacher network, based on the second output; and
train the student network by updating the student network based on the pseudo label and the prediction result.

17. The electronic device of claim 16, wherein, for the generating of the first output of each of the two or more layers of the teacher network, the processor is configured to:
generate one or more second images by performing weak enhancement processing on the first image; and
generate one or more third images by performing strong enhancement processing on the first image, and based on the one or more second images, generate the first output of each of the two or more layers of the teacher network corresponding to the one or more second images, and wherein a number of the one or more second images and a number of the one or more third images are the same.

18. The electronic device of claim 16, wherein, for the generating of the second output, the processor is configured to:

based on the one or more third images, generate an output of each layer of one or more layers of the student network comprising the output layer corresponding to the one or more third images, and generate the second output by merging the output of each layer corresponding to the one or more third images into the corresponding second outputs.

19. The electronic device of claim 17, wherein, for the generating of the one or more third images, the processor is configured to:

generate a plurality of strong first images by performing strong enhancement processing on the first image;

generate a plurality of strong additional images by performing strong enhancement processing on an additional image; and generate the one or more third images by fusing the plurality of strong first images and the plurality of strong additional images, and the plurality of strong first images each have a size different from a size of the first image.

20. The electronic device of claim 17, wherein, for the generating of the pseudo label, the processor is configured to:

generate intermediate images respectively corresponding to second images by resizing each of weak first images and overlapping each of the weak first images in response to performing resizing on a corresponding predetermined area;

generate a third output of each layer of the two or more layers of the teacher network corresponding to the intermediate image corresponding to each of the second images;

generate pseudo labels respectively corresponding to the third outputs based on the third outputs; and generate final pseudo labels respectively corresponding to the first outputs by fusing the pseudo labels respectively corresponding to the first outputs and the pseudo labels respectively corresponding the third outputs, wherein each of the second images and the intermediate image corresponding to each of the second images are generated based on the same weak first image and weak additional image.

21. The electronic device of claim 16, wherein the one or more layers in the student network comprising the output layer are adjacent to another layer.

22. The electronic device of claim 16, wherein, for the generating of the pseudo labels, the processor is configured to:

determine a similarity between the first output of each of the two or more layers of the teacher network and a previous output of a corresponding layer of the two or more layers of the teacher network; and generate the pseudo labels respectively corresponding to the first outputs, based on the determined similarities.

23. A processor-implemented method, the method comprising:

generating a first output of each of two or more layers of a teacher network, based on a first image;

determining a similarity between the first output of each of the two or more layers of the teacher network and a previous output of a corresponding layer of the two or more layers of the teacher network;

generating pseudo labels respectively corresponding to the first outputs, based on the determined similarities;

generating prediction results respectively corresponding to the two or more layers of the teacher network, based on a second output generated using one or more layers of a student network; and training the student network by updating the student network based on the pseudo labels and the prediction results.

* * * * *